United States Patent [19]

Cullen et al.

[11] Patent Number: 5,125,761

[45] Date of Patent: Jun. 30, 1992

[54] SEISMIC HOLD DOWN DEVICE

[76] Inventors: William E. Cullen, 239 Cleveland Ave., Mill Valley, Calif. 94941; James E. Wilson, 24 Bahama Reef, Novato, Calif. 94949

[21] Appl. No.: 506,326

[22] Filed: Apr. 9, 1990

[51] Int. Cl.⁵ .............................................. B25G 3/36
[52] U.S. Cl. ........................... 403/391; 403/314; 403/303; 24/132 R
[58] Field of Search ............... 403/314, 390, 391, 303; 24/132 R, 134 R, 134 P, 134 KA

[56] References Cited

U.S. PATENT DOCUMENTS

| | | | |
|---|---|---|---|
| 499,090 | 6/1893 | Bodine | 403/303 |
| 668,499 | 2/1901 | Dalton et al. | 24/134 R |
| 848,035 | 3/1907 | Ketteman | 403/314 |
| 2,032,492 | 3/1936 | Nathan | 285/90 |
| 2,271,270 | 1/1942 | McLearn | 403/391 |
| 3,026,497 | 3/1962 | Meyers et al. | 403/391 X |
| 3,115,727 | 12/1963 | Middendorf | 50/128 |
| 3,279,135 | 10/1966 | Jacobsen | 52/127 |
| 3,594,971 | 7/1971 | Hughes | 52/648 |
| 3,875,710 | 4/1975 | Dawson et al. | 52/236 |
| 3,881,289 | 5/1975 | Mauroner | 52/259 |
| 3,998,478 | 12/1976 | Zopfi | 285/110 |
| 4,001,990 | 1/1977 | Chase et al. | 52/167 |
| 4,321,776 | 3/1982 | Delight | 52/167 |
| 4,450,659 | 5/1984 | Hanaoka et al. | 52/167 |

FOREIGN PATENT DOCUMENTS

| | | | |
|---|---|---|---|
| 127187 | 6/1945 | Australia | 24/134 R |
| 721464 | 1/1955 | United Kingdom | 24/134 R |

*Primary Examiner*—Andrew V. Kundrat
*Attorney, Agent, or Firm*—Graham & James

[57] ABSTRACT

A system for splicing rods to connect a shear wall (12) to a concrete foundation (6). The system includes a hold down device (2) coupling a first rod (4) extending upwardly from the foundation with a second rod (8) suspended downwardly from the top (10) of the shear wall. The hold down device includes a body member (14) having a rod support (22) disposed on one side of the rods and two pairs of arms (32, 34) through which the rods extend. A cam element (54, 56) is disposed within the body member for positioning the rods within the body member. A securing bolt (18) extends through the rod support for securely retaining the cam element in position.

13 Claims, 2 Drawing Sheets

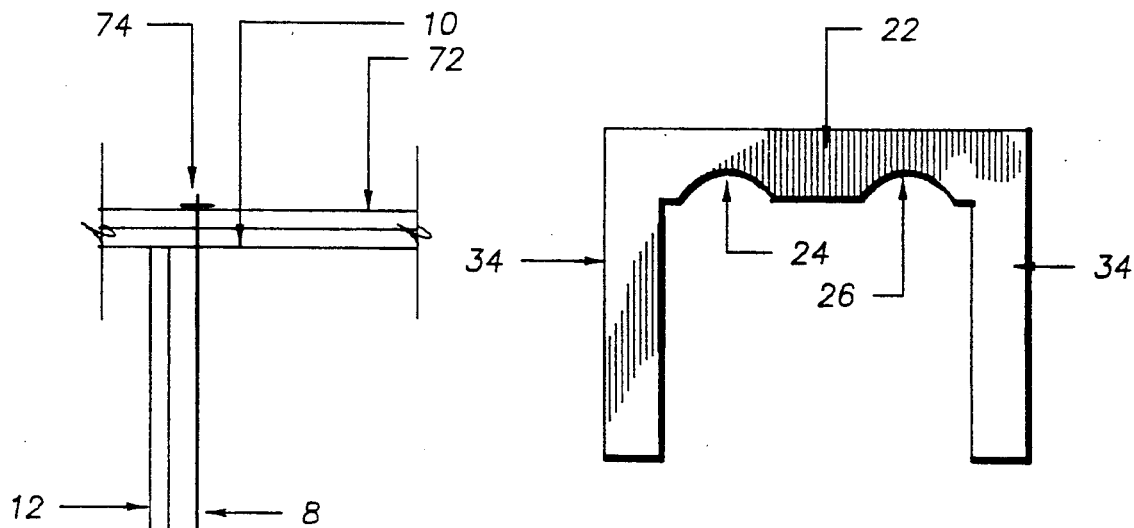
FIG. 3.
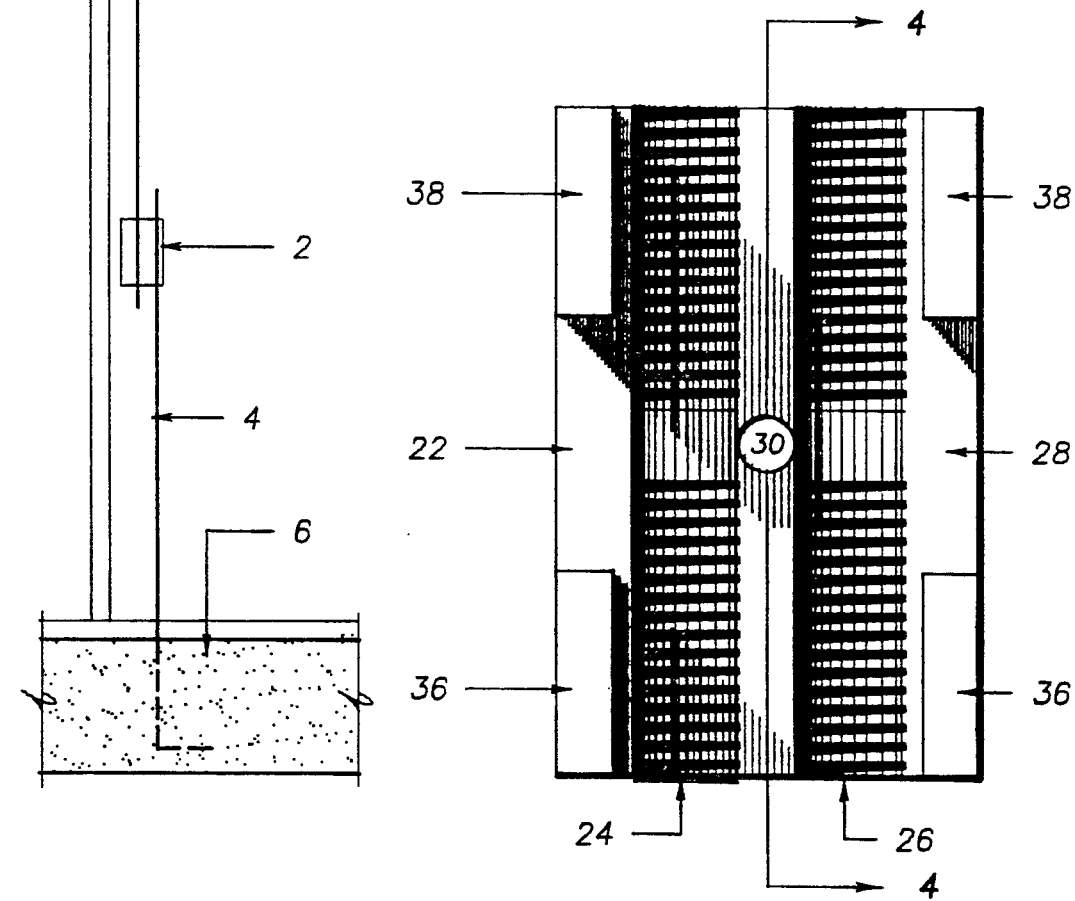
FIG. 1.
FIG. 2.

SEISMIC HOLD DOWN DEVICE

BACKGROUND OF THE INVENTION

In the construction industry, shear walls are often employed to prevent the collapse of structures. A shear wall is designed to resist the overturning moment caused by an earthquake or wind loading. These walls must be securely fastened to the concrete foundation so that the overturning moments do not cause separation of the upper portion of a building structure from its lower portion.

Hold downs are commonly employed to connect a shear wall to the foundation. The most common practices today require precise placement of bolts in the concrete foundation and shear wall.

Typically, prior to curing of the concrete, the bolt is positioned to extend upwardly from the foundation. A conventional hold down bracket includes an L-shaped member having a hole formed in a first leg for receiving the bolt extending upwardly from the foundation. Subsequently, bolts are drilled through the wood frame structure of the shear wall at a position above the foundation. The second leg of the L-shaped member is thus bolted to the lower end of the frame structure. The hold downs must be precisely positioned such that the holes of the bracket are accurately aligned with the bolts. Misalignment of the bolts and holes precludes assembly of the hold down device. This requires labor intensive drilling through the wood frame structure of the shear wall above.

SUMMARY OF THE INVENTION

The present invention is directed to a system for connecting a shear wall to a concrete foundation. The system includes a hold down device coupling a first rod extending upwardly from the foundation with a second rod suspended downwardly from the top of the shear wall. The hold down device couples the first and second rods and is designed such that the rods need not be precisely positioned.

In the preferred embodiment, the hold down device includes an integral, C-shaped body member having an opening for receiving the rods. A cam is disposed within the body member for coupling the rods. A securing bolt extends through the rod support and is tightened by a nut, thereby retaining the cam in position.

The body member preferably includes a rod support defining a plane oriented parallel to the longitudinal axis of the rods. A pair of arms projects perpendicularly from each end of the rod support toward the rods such that the rods are disposed between each of the pairs of arms. An extension projects from a distal end of each arm in a direction parallel to the longitudinal axis of the rods, forming a socket between each pair of arms and respective extensions.

The cam preferably includes a pair of identical pivoting cam elements each disposed within the body member. A hub is formed with each cam element and is received within one of the body member sockets such that the cam element pivots about a hub formed with the cam element. In the preferred embodiment, each cam element includes a contact surface having a generally curved cross-sectional configuration and a depression formed longitudinally therein for receiving and engaging each rod. A planar surface is disposed opposite the contact surface such that the hub is disposed at the junction of the planar and contact surfaces. As the nut is tightened onto the securing bolt, it cooperates with the planar surfaces, pivoting the cam elements such that the contact surfaces cut into and grip the rods.

In the preferred embodiment, the hold down device extends the entire height of the shear wall, providing a coupling connection between the shear wall and concrete foundation which is more secure than a conventional hold down device bolted to the shear wall only at its lower edge. Additionally, imprecisely placed or bent rods will be accommodated by the large opening formed between the arms, the rods extending through the body member. Precise alignment or exact placement of the rods in the present invention is no longer required, reducing the labor intensive procedure required for assembling prior art hold down devices. Any misalignment of the rods within the opening is compensated for by the amount by which the cam means can be tightened. Thus, commonly available deformed steel concrete reinforcing bars may be employed.

BRIEF DESCRIPTION OF THE DRAWINGS

FIG. 1 is a schematic view of the seismic hold down system of the present invention.

FIG. 2 is a front elevational view of the body member of the present invention.

FIG. 3 is a top view of the body member of FIG. 2.

DETAILED DESCRIPTION OF THE PREFERRED EMBODIMENT

Figure 4:
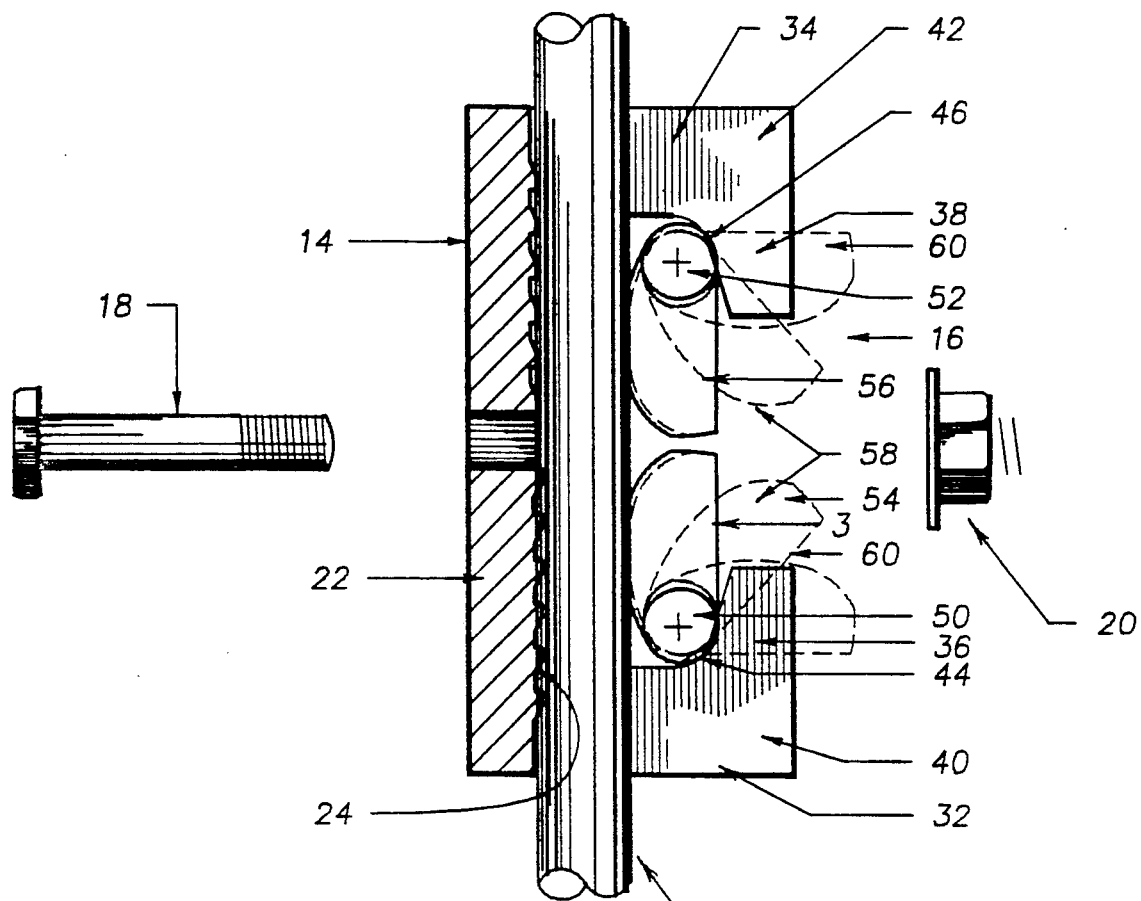
FIG. 4 is a cross-sectional view of the assembled hold down device taken along lines 4—4 of FIG. 2.

Referring to FIG. 1, hold down device 2 couples a first rod 4 extending upwardly from a concrete foundation 6 with a second rod 8 suspended downwardly from the top 10 of a shear wall 12. First and second rods 4, 8 are oriented substantially parallel to each other, extending upwardly and downwardly, respectively, such that the upper and lower ends have a coincident vertical elevation. First and second rods 4, 8 may be commonly available deformed steel concrete reinforcing bars. Alternatively, the rods may be flexible.

A top plate 72 is nailed to a horizontal member overlying studs of shear wall 12 and extends slightly beyond top 10 of the shear wall. The upper end of second rod 8 is threaded into a hole (not shown) which is drilled through top plate 72, although any type of connection for second rod 8 to top plate 72 may be utilized. A steel plate 74 overlies the connection of the second rod to top plate 72.

Hold down device 2, as seen in FIGS. 2-6, includes a C-shaped, integral body member 14 for coupling first and second rods 4, 8. Cam means 16 is disposed within body member 14 for positioning the rods within the body member. A securing bolt 18 extends through body member 14 and is tightened by nut 20 for retaining the positioning of cam means 16.

Body member 14, as seen in FIGS. 2-4 includes a substantially planar rod support 22 oriented parallel to the longitudinal axes of the first and second rods 4, 8. Depressions 24, 26 disposed in an inner wall 28 of rod support 22 receive rods 4, 8, respectively. A hole 30 is formed in the center of rod support 22 through which securing bolt 18 is inserted. Two pairs of arms 32, 34 project perpendicularly from each end of rod support 22 towards rods 4, 8, such that the rods are disposed between each pair of arms 32, 34. An extension 36, 38 is disposed at the distal ends 40, 42 of each arm 32, 34. Rod support 22, together with pairs of arms 32, 34, and extensions 36, 38 form the C-shaped configuration of body member 14. A socket 44, 46 is formed at the juncture of arms 32, 36 and 34, 38, respectively. An opening configured between arms 32, 34 receives rods 4, 8.

Figure 6:
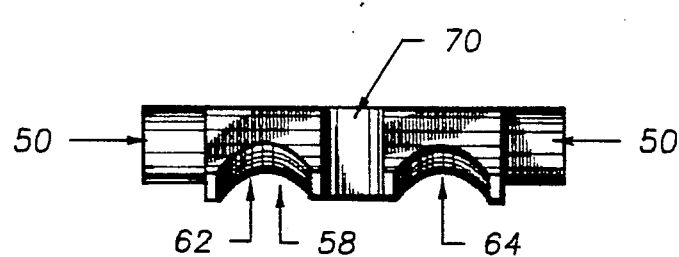
FIG. 6 is a view taken along lines 6—6 of FIG. 5.
Figure 5:
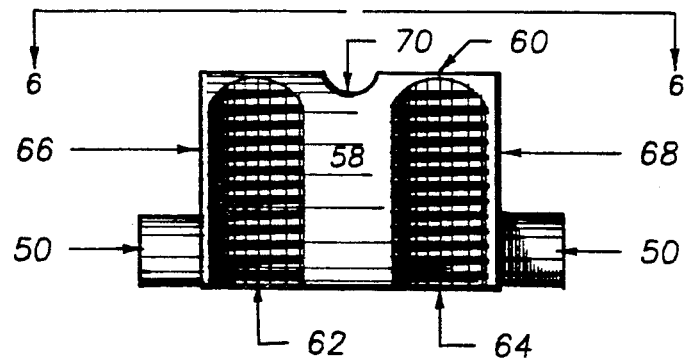
FIG. 5 is an elevational side view of the cam of the present invention illustrating the contact surfaces.

Cam means 16 as seen in FIGS. 4–6 are positioned within the area of the C-shaped space formed by body member 14 such that hubs 50, 52 are disposed within sockets 44, 46, respectively. Cam means 16 includes two separate cam elements 54, 56. The cross-sectional configuration of each cam element includes a curved contact surface 58 and a planar surface 60 opposite the contact surface. A pair of depressions 62, 64 is formed in each contact surface 58 adjacent each outer edge 66, 68 of the cam elements. Depressions 62, 64 extend longitudinally in the cam element for receiving rods 4, 8 in conjunction with depressions 24, 26. An indentation 70 is formed at the center of planar surface 60 aligned with hole 30 of rod support 22 through which securing bolt 18 is fastened.

In operation, first rod 4 is placed to extend upwardly from foundation 6. Second rod 8 is threaded to top plate 72 so as to be suspended from the top 10 of shear wall 12. Hold down device 2 is then tightened to couple first and second rods together. First and second rods 4, 8 are positioned in depressions 24, 62 and 26, 64, respectively. Securing bolt 18 is inserted through hole 30 and indentation 70 for tightening cam means 16, by pivoting of cam elements 54, 56 about hubs 50, 52 within sockets 44, 46. Contact surfaces 58 cut into and grip rods 4, 8 as nut 20 is tightened. The configuration of cam elements 54, 56 results in further tightening of cam means 16 when a tensile load is applied to the rods 4, 8. Thus, when overturning moments occur due to an earthquake or wind loading, hold down device 2 prevents the collapse of building structures employing the system of the present invention.

This invention has been described with reference to the preferred embodiment. Variations and modifications can be made without departing from the scope of the invention, which is limited only by the following claims.

We claim:

1. A device for coupling rods comprising a body member having means for receiving the rods to be coupled, cam means for positioning the rods within said receiving means, securing means for retaining said cam means in position, said body member comprising means for supporting said rods, said rod support means defining a plane oriented parallel to the longitudinal axis of the rods, a pair of arms projecting perpendicularly from each end of said support means toward the rods such that the rods are disposed between each of said pairs of arms, and an extension projecting from an end of each arm in a direction parallel to the longitudinal axis of the rods, thereby forming a socket between each pair of arms and respective extensions.

2. The device as defined in claim 1 wherein said cam means are disposed within said body member.

3. The device as defined in claim 1 wherein said securing means comprises a bolt.

4. The device as defined in claim 1 wherein said body member includes a depression for receiving each rod.

5. The device as defined in claim 1 wherein said cam means includes a depression for positioning each rod.

6. The device as defined in claim 1 wherein said body comprises a C-shaped member.

7. The device as defined in claim 1 wherein said body comprises an integral member.

8. The device as defined by claim 1 wherein said cam means comprises a cam element including a hub disposed in each socket.

9. The device as defined by claim 1 wherein said rod support means includes a hole formed therein for receiving said securing means.

10. The device as defined by claim 1 wherein said rod support means includes a depression for receiving each rod, the depressions being spaced from each other and oriented parallel to the longitudinal axis of the rods.

11. The device as defined by claim 10 wherein said cam means includes a depression corresponding to each depression of said rod support means.

12. A device for coupling rods comprising:
an integral body member comprising a rod support means defining a plane oriented parallel to the longitudinal axis of the rods, each rod being receivable in a body member depression formed in said rod support means oriented parallel to the longitudinal axis of the rods, a pair of arms projecting perpendicularly from each end of said rod support means toward the rods such that the rods are disposed between each of said pairs of arms, and an extension projecting from an end of each arm in a direction parallel to the longitudinal axis of the rods, thereby forming a socket between each pair of arms and respective extensions;
a cam element including a hub disposed within each socket having a corresponding depression for positioning the rods within said body member depression; and
securing means extending through said rod support means for retaining said cam element in position.

13. The device as defined in claim 12 wherein each rod is received in a separate body member depression oriented parallel to the longitudinal axis of the rods.

* * * * *